Patented Jan. 26, 1932

1,842,673

UNITED STATES PATENT OFFICE

GLENN H. JOSEPH, OF ONTARIO, CALIFORNIA, ASSIGNOR TO CALIFORNIA FRUIT GROWERS EXCHANGE, OF LOS ANGELES, CALIFORNIA, A CORPORATION OF CALIFORNIA

FOOD PRODUCT

No Drawing.   Application filed May 14, 1929.   Serial No. 363,104.

This invention relates to a new food product and refers more particularly to jellies having a honey base.

Jellies are commonly prepared from fruit juices or other flavored compositions by bringing together in solution the fruit juices, sugar and pectin under the proper concentration so that the pectin can cause the formation of a jelly when the batch is cool. Four constituents are ordinarily recognized as required to form jelly. These constituents are water, sugar, pectin and an acid. In the ordinary practice of making jellies, sugar content of the final product is usually between 60 and 65 percent and the sugar employed is generally cane sugar or sucrose. When it is attempted to manufacture jelly substituting honey as a source of sugar, it is found that the resulting product becomes tough and rubbery, its color darkens appreciably on storage and the flavor becomes strong and unpleasant.

It is the primary object of the present invention to provide a food product or jelly in which a large part or most of the sugar in the jelly is derived from honey, while at the same time, a product is prepared having none of the undesirable characteristics of ordinary honey pectin jellies. More particularly, it is the object of the invention to provide a honey jelly product whose texture and flavor are satisfactorily retained during commercial handling, storage and use.

A further object is to provide a honey jelly which has little tendency to become rubbery and tough.

Briefly considered, the invention comprises the discovery that in the production of a honey jelly product in which pectin and honey are employed, a superior jelly is obtained, if a proportion of the total sugar content of the jelly comprises a commercial sugar product, such as cane, beet or corn sugar, and only a part of the sugar content of the jelly is derived from the honey itself.

The invention also includes the discovery that in the manufacture of a honey pectin jelly, a smaller amount of pectin should be employed than that which is required to jellify an amount of cane sugar corresponding to the total sugar content of the jelly (or, in other words, using more total sugar than the pectin would jellify if only cane sugar were used).

It has been found that by employing a mixture of honey sugar and cane sugar to make up the total sugar content of jelly, the texture, flavor and storage characteristics of the jelly are materially improved and by using less pectin than would be required for the same amount of cane sugar, the tendency of honey jellies to become rubbery and tough soon after storage is substantially overcome.

Different pectins vary as to their ability of forming a jell with sugar. This variation in the jellifying power of pectin is in the art ordinarily referred to as the "grade" of pectin. The term "grade" when applied to pectin, is used to mean the weight of sugar which a unit weight of pectin will jellify in presence of acid when made into a jelly containing some definite percentage of sugar. Herein any values or "grades" of pectin set forth are based upon jellies containing 65 percent of sugar. Thus, for example, 160 grade defines a pectin, one pound of which will produce with 160 pounds of sugar and a suitable amount of acid, a jelly containing 65 per cent sugar.

The decreased amount of pectin to be employed in accordance with this invention varies over a wide range, depending upon the grade of pectin employed. As a general rule, however, it may be stated that it is preferable to decrease the amount of pectin employed from 6 to 24 percent. Thus, for example, if pectin of 160 grade is employed and the pectin required to produce the product, when calculated on the basis of all of the sugar as cane sugar, is 10 grams, a honey jelly prepared in accordance with my invention would preferably include between 7.6 and 9.4 grams of pectin.

Tests have shown that honey jellies produced by so reducing the amount of pectin added may be stored for at least eight months and at temperatures varying from room temperature up to 100° F. without becoming noticeably tough or rubbery, whereas jellies produced according to the usual methods of making jelly soon become tough and rubbery even at room temperature. The flavor of my product is also improved; being more nearly the same as the pure honey flavor.

In accordance with another feature of my invention, it is my object to improve the storage characteristics of honey jellies and more particularly to reduce the darkening of such jellies upon storage, especially at elevated temperatures, and to improve the texture so that these jellies even after long storage may be as readily spread upon bread, cakes, griddle cakes, waffles, crackers and the like as can normal household fruit jellies. This object I accomplish by replacing a portion of the honey-sugar with a commercial sugar composition, preferably cane, beet, or corn sugar. By so employing a mixture of honey and sugar to provide the desired sugar percentage, I have found that the texture of the jelly, either when fresh or after storage, and particularly after long periods of storage, is appreciably improved. In addition, jellies including some sugar other than that of the honey show appreciably less darkening with time and temperature changes.

The proportions of sugar which can be added to produce the desired improved texture and storage characteristics without at the same time destroying the characteristic honey flavor will vary with the flavor of the honey per se, it being possible to employ more sugar with the stronger flavored honeys. For the common honeys, however, such as orange blossom, sage, white clover and thistle, an added sugar percentage ranging from ten to fifty percent of the total sugar percentage has been found to give satisfactory results. Within this range, added sugar percentages from fifteen to thirty percent of the total sugar are considered as preferable. The honey-sugar content will conversely be 85-70% of the total sugar when within the preferred range.

The particular sugar used in any case will be determined by the characteristics desired in the final product. In general, cane or beet sugar will be found satisfactory, but cerelose (corn sugar) can be used if it is desired to reduce the sweetness of the final product. Cerelose has less tendency to mask the characteristic honey flavor than has cane sugar. The term "cane sugar" as used in the claims, refers to such added sugar, whether it be cane, beet or corn sugar, thus distinguishing from the sugar present in the honey.

The amount of acid employed to cause jellification of honey jellies is appreciably less than would be required to jellify an equal amount of sugar in a fruit jelly and it is thus possible to retain the honey flavor which would be injured by the amount of acid normally used for making fruit jellies.

Though the acid contents of various honeys are appreciably different, I have found that the amount of added acid required for the production of honey jellies is substantially the same for all ordinary honeys. For anhydrous tartaric acid, the addition of 0.05 to 0.07 percent of the weight of the total jelly batch will serve to give the necessary acidity. For other acids, the amount required varies according to the hydrogen ion activity, decreasing with increasing activities.

Since individual honeys vary appreciably in their content of sugar, the limits of the percentage of honey in the final product will be determined by the maximum and minimum sugar contents of honeys in combination with the range of honey-sugar contents in the final product (i. e. 70-85% of the total sugar in the jelly). In 1920 edition of "Food Inspection and Analysis" (John Wiley & Sons, Inc.) by Albert E. Leach, page 666, the average maximum and average minimum sugar contents of the common varieties of honeys are disclosed. From this table, alfalfa honey is seen to contain the highest percentage of sugar (89.19%) while sumac honey contains the lowest (68.97%). The minimum honey content within the preferred range will therefore exist in a 60% sugar jelly containing 70% of its sugar as honey-sugar and prepared from alfalfa honey. For the maximum value of the honey content, the determination is made with a 65% sugar jelly, 85% of the total sugar being honey-sugar, prepared from sumac honey. The preferred range therefore comprises 47 to 80%.

The following formulas set forth features of the invention:

*Formula A*

| Material | Weight (g.) | Per cent |
|---|---|---|
| Honey | 937.50 | 62.50 |
| Cane sugar | 243.70 | 16.25 |
| Dry pectin—165 grade (used as 175 grade) | 5.55 | 0.37 |
| Water | 301.90 | 20.12 |
| Tartaric acid—anhydrous | 1.05 | 0.07 |
| Glycerol | 10.30 | 0.69 |
| Total | 1,500.00 | 100.00 |

Percentage sugar in jelly_____ 65.0
Percentage sugar=honey sugar_____ 75.0
Pounds sugar per 1 lb. 165 grade pectin_____ 175.0

*Formula B*

| Material | Weight (g.) | Per cent |
|---|---|---|
| Honey | 938.00 | 63.13 |
| Cane sugar | 244.00 | 16.42 |
| Dry pectin—190 grade (used as 205 grade) | 4.76 | 0.32 |
| Water | 298.25 | 20.08 |
| Tartaric acid—anhydrous | 0.84 | 0.05 |
| Total | 1,485.85 | 100.00 |

Percentage sugar in jelly_____ 65.65
Percentage sugar=honey sugar_____ 75.00
Pounds sugar per 1 lb. 190 grade pectin_____ 205.00

In Formula A, the pectin is decreased approximately 6 percent (10/165) and the acid used is 0.07 percent, while Formula B specifies the use of 0.05 percent acid and a decrease in the pectin content of 7.9 percent (15/190). Glycerol is used in Formula A to facilitate dispersion of the pectin while a portion of the sugar may be used for this purpose with Formula B.

The preparation of a jelly from the above formulas comprises dispersing the pectin-glycerol (or pectin-sugar) mixture in the water, adding the sugar, heating to from 75-80° C. and adding to the honey which has been previously warmed preferably slowly as in a steam-jacketed kettle, to from 60-80° C. The acid is then added and the batch poured into moulds and allowed to set. The setting will usually be complete within half an hour.

Though my invention is here described in connection with a dry pectin preparation, it will be understood that it is equally applicable to use with liquid pectin preparations. When the latter are used, the amount of water employed is preferably changed in accordance with the concentration of the liquid pictin, so that the total water (including that of the pectin solution) will not exceed the desired amount, (e. g. 301.90 g. or 298.25 g. in the above formulas).

While the particular forms of the invention herein described are well adapted to carry out the objects of the invention, it is to be understood that various modifications and changes may be made without departing from the invention, and the invention includes all such modifications and changes as come within the scope of the appended claims.

I claim:

1. A firm jelly capable of being kept without becoming rubbery or tough in texture, consisting exclusively of honey, cane sugar, purified pectin, edible acids, and water, said jelly being free of any fruit flavors, said cane sugar constituting from about 10% to 50% of the total sugar content of the jelly.

2. A firm jelly capable of being kept without becoming rubbery or tough in texture, consisting exclusively of honey, cane sugar in amount sufficient to constitute 15% to 30% of the total sugar content of the jelly, purified pectin, an edible acid, and water, said jelly being capable of being kept in storage without darkening in color and without the development of strong and unpleasant flavors.

3. A firm jelly capable of being kept without becoming rubbery or tough in texture, consisting exclusively of honey, cane sugar in amount sufficient to constitute 15% to 30% of the total sugar content of the jelly, purified pectin, an edible acid, and water, said jelly being capable of being kept in storage without darkening in color and without the development of strong and unpleasant flavors, said jelly being free of any fruit flavors.

Signed at Ontario, California, this 29th day of April, 1929.

GLENN H. JOSEPH.